United States Patent
Malta

(10) Patent No.: US 8,958,930 B2
(45) Date of Patent: Feb. 17, 2015

(54) DYNAMIC LIMITATION OF MONOBLOCK FLIGHT CONTROL SURFACES INCLINATIONS DURING STALL SUSCEPTIBILITY CONDITIONS

(75) Inventor: Dan Malta, Modiin (IL)

(73) Assignee: Elbit Systems Ltd., Haifa (IL)

( * ) Notice: Subject to any disclaimer, the term of this patent is extended or adjusted under 35 U.S.C. 154(b) by 18 days.

(21) Appl. No.: 13/982,450

(22) PCT Filed: Jan. 30, 2012

(86) PCT No.: PCT/IL2012/050030
§ 371 (c)(1),
(2), (4) Date: Jul. 29, 2013

(87) PCT Pub. No.: WO2012/101645
PCT Pub. Date: Aug. 2, 2012

(65) Prior Publication Data
US 2013/0311011 A1    Nov. 21, 2013

(30) Foreign Application Priority Data

Jan. 30, 2011   (IL) .......................................... 210961
Feb. 3, 2011   (IL) .......................................... 211060
Jun. 23, 2011   (IL) .......................................... 213752

(51) Int. Cl.
*B64C 13/00*    (2006.01)
*B64C 13/16*    (2006.01)
*B64C 5/02*    (2006.01)
*G05D 1/00*    (2006.01)

(52) U.S. Cl.
CPC . *B64C 13/16* (2013.01); *B64C 5/02* (2013.01); *G05D 1/0066* (2013.01)

USPC ............... 701/3; 701/4; 701/5; 701/6; 701/7; 701/8; 701/9; 701/10; 244/75.1

(58) Field of Classification Search
None
See application file for complete search history.

(56) References Cited

U.S. PATENT DOCUMENTS

| 5,000,404 A | * | 3/1991 | Martorella | .................... 244/188 |
| 5,083,279 A | * | 1/1992 | Burdoin | ........................... 701/6 |
| 5,299,455 A | * | 4/1994 | Mangalam | ...................... 73/180 |

(Continued)

OTHER PUBLICATIONS

International Search Report dated Feb. 8, 2012 for International Application No. PCT/IL2012/050030.

(Continued)

*Primary Examiner* — Jonathan M. Dager
(74) *Attorney, Agent, or Firm* — Paul D. Bianco; Martin Fleit; Fleit Gibbons Gutman Bongini & Bianco PL

(57) ABSTRACT

Method for dynamically limiting the inclinations of monoblock flight control surfaces (FCS) in an aircraft. Dynamic limitation of the FCS is activated if a stall susceptibility condition is detected in the current aircraft environment. The real-time calibrated airspeed of the aircraft, real-time angle of attack (AOA) of the aircraft, and real-time sideslip angle (AOS) of the aircraft are obtained. The aircraft parameters may be obtained via estimation if the measured values are deemed unsuitable. The real-time local AOA and AOS of the FCS are calculated based on the obtained aircraft parameters. The inclination of each of the FCS relative to the critical values is dynamically limited according to the calculated real-time local AOA and AOS of the FCS. The aircraft may be an unmanned aerial vehicle (UAV) and/or a V-tail aircraft. The stall susceptibility condition may include icy conditions.

17 Claims, 9 Drawing Sheets

(56) References Cited

U.S. PATENT DOCUMENTS

| | | | |
|---|---|---|---|
| 5,595,357 A * | 1/1997 | Catlin et al. | 244/1 R |
| 5,796,612 A * | 8/1998 | Palmer | 701/4 |
| 5,826,834 A | 10/1998 | Potter et al. | |
| 5,836,546 A * | 11/1998 | Gast | 244/76 B |
| 6,089,503 A * | 7/2000 | Volk | 244/48 |
| 6,169,496 B1 * | 1/2001 | Martin et al. | 340/966 |
| 6,246,929 B1 * | 6/2001 | Kaloust | 701/11 |
| 6,253,126 B1 * | 6/2001 | Palmer | 701/14 |
| 6,273,370 B1 * | 8/2001 | Colgren | 244/181 |
| 7,676,303 B2 * | 3/2010 | Hanel | 701/3 |
| 7,959,111 B1 * | 6/2011 | Dirks et al. | 244/181 |
| 8,214,089 B2 * | 7/2012 | Caldeira et al. | 701/6 |
| 8,340,841 B2 * | 12/2012 | Chiesa | 701/6 |
| 8,359,128 B1 * | 1/2013 | Segal et al. | 701/3 |
| 8,695,412 B2 * | 4/2014 | Mandle | 73/147 |
| 8,774,987 B2 * | 7/2014 | Walton et al. | 701/10 |
| 2004/0044444 A1 * | 3/2004 | Johnson et al. | 701/3 |
| 2005/0090947 A1 * | 4/2005 | Wise | 701/6 |
| 2008/0133069 A1 * | 6/2008 | Morales De La Rica et al. | 701/4 |
| 2008/0147251 A1 * | 6/2008 | Luo | 701/3 |
| 2008/0147254 A1 * | 6/2008 | Vos et al. | 701/8 |
| 2008/0147255 A1 * | 6/2008 | Alwin et al. | 701/14 |
| 2008/0283674 A1 * | 11/2008 | Shepshelovich et al. | 244/35 R |
| 2009/0062973 A1 * | 3/2009 | Caldeira et al. | 701/6 |
| 2009/0090817 A1 * | 4/2009 | Monka | 244/76 R |
| 2009/0099811 A1 * | 4/2009 | Spoerry et al. | 702/151 |
| 2009/0157364 A1 * | 6/2009 | Velazquez Lopez et al. | 703/8 |
| 2010/0171002 A1 * | 7/2010 | Hahn | 244/76 C |
| 2010/0252674 A1 * | 10/2010 | Lang | 244/36 |
| 2012/0205490 A1 * | 8/2012 | Whitehouse et al. | 244/89 |

OTHER PUBLICATIONS

Malcolm J. Abzug, V-Tail Stalling at Combined Angles of Attack and Sideslip, journal, Mar. 20, 1999, pp. 729, vol. 36, J. Aircraft, Pacific Palisades, California.

* cited by examiner

DYNAMIC LIMITATION OF MONOBLOCK FLIGHT CONTROL SURFACES INCLINATIONS DURING STALL SUSCEPTIBILITY CONDITIONS

FIELD OF THE DISCLOSED TECHNIQUE

The disclosed technique generally relates to V-tail aircrafts with automatically controlled monoblock flight control surfaces.

BACKGROUND OF THE DISCLOSED TECHNIQUE

Conventional aircrafts are usually designed in a T-tail configuration, in which there are three tail stabilizing surfaces at the rear of the aircraft, with two horizontally oriented stabilizers mounted on either side of a vertically oriented stabilizer, resembling the shape of the letter "T" when viewed from the front or rear. An alternative configuration is the "V-tail", also known as a "butterfly tail", where the three tail stabilizers (two horizontal and one vertical) are replaced with two slanted stabilizers, resembling the shape of the letter "V" when viewed from the front or rear. The movable flight control surfaces differ between these two types of aircrafts. Whereas a T-tail aircraft includes "rudders" and "elevators", for separately controlling the yaw and pitch motions, respectively, a V-tail aircraft includes "ruddervators", which control the yaw and pitch motions jointly.

In a T-tail aircraft, the rudders are mounted on the trailing edges on either side of the vertical stabilizer (or "fin"), and the elevators are mounted on the trailing edges of each of the two horizontal stabilizers (or "tailplanes"). In a V-tail aircraft, there are two ruddervators mounted on the trailing edge of the left and right tail stabilizers, respectively. A T-tail aircraft pitches down by tilting both elevators downwards, resulting in lower pressure above each tailplane and higher pressure below, causing the tailplanes to lift and the aircraft to nose-down. Correspondingly, when both elevators are raised, the pressure is reduced below the tailplanes and raised above them, causing the aircraft to tail-down and nose-up. A V-tail aircraft pitches down by tilting the left ruddervator downward and to the left and tilting the right ruddervator downward and to the right, producing an overall tail lifting force while the resultant left and right yaw forces cancel each other out. Correspondingly, a V-tail aircraft pitches up by raising the left ruddervator upward and to the right and tilting the right ruddervator upward and to the left, producing an overall downward force on the tail stabilizers while the resultant left and right yaw forces cancel each other out.

A T-tail aircraft yaws to the right by tilting both rudders to the right, resulting in lower pressure on the left side of the fin and higher pressure to the right, causing the tail to move left and the aircraft to nose-right. Correspondingly, when both rudders are tilted to the left, the pressure is reduced on the right side of the fin and raised on the left side, causing the tail to move right and the aircraft to nose-left. A V-tail aircraft yaws to the right by tilting the left ruddervator upward and to the right while tilting the right ruddervator downward and to the right, resulting in an overall tail-rightward force (causing the aircraft to nose-right) while the resultant up and down pitch forces cancel each other out. Correspondingly, a V-tail aircraft yaws to the left by tilting the left ruddervator downward and to the left while tilting the right ruddervator upward and to the left, resulting in an overall tail-leftward force (causing the aircraft to nose-left) while the resultant up and down pitch forces cancel each other out.

In general, a V-tail aircraft has less weight and produces less drag relative to a T-tail aircraft, but requires a more complex control system to handle the flight control surfaces and also suffers reduced directional dynamic stability.

In some aircrafts, the flight control surfaces are integrally formed together with the respective tail stabilizer surfaces, rather than being formed as a separate movable trailing edge. Such a design is also referred to as a "monoblock" configuration.

Aircrafts generally have multiple control surfaces, each of which may incline or tilt about a different rotational axis, for controlling different types of aircraft motion. Reference is now made to FIGS. 1A, 1B, and 1C. FIG. 1A is a rear view schematic illustration of a V-tail aircraft 10 ruddervator, referenced 14, in a centered position about a first rotational axis, referenced 18. FIG. 1B is a rear view schematic illustration of the ruddervator 14 of FIG. 1A rotated in a clockwise direction. FIG. 1O is a rear view schematic illustration of the ruddervator 14 of FIG. 1A rotated in a counterclockwise direction.

Reference is now made to FIGS. 2A, 2B and 2C. FIG. 2A is a top view schematic illustration of a V-tail aircraft, referenced 20, with ruddervators, referenced 22 and 24, in a centered position about a second rotational axis, referenced 26. FIG. 2B is a top view schematic illustration of the V-tail aircraft 20 of FIG. 2A with ruddervators 22, 24 rotated in a first direction. In particular, both ruddervators 22, 24 are tilted toward the rear of aircraft 20 (i.e., when viewed from the top of aircraft 20, right ruddervator 22 is tilted clockwise and left ruddervator 24 is tilted counterclockwise). FIG. 2C is a top view schematic illustration of the V-tail aircraft 10 of FIG. 2A with ruddervators 22, 24 rotated in a second direction. In particular, both ruddervators 22, 24 are tilted toward the front of aircraft 20 (i.e., when viewed from the top of aircraft 20, right ruddervator 22 is tilted counterclockwise and left ruddervator 24 is tilted clockwise).

Reference is now made to FIGS. 3A, 3B and 3C. FIG. 3A is a rear view schematic illustration of a V-tail aircraft, referenced 30, with ruddervators, referenced 32 and 34, in a centered position about a third rotational axis, referenced 36. FIG. 3B is a rear view schematic illustration of the V-tail aircraft 30 of FIG. 3A with ruddervators 32, 34 rotated in a first direction. In particular, both ruddervators 32, 34 are tilted upwards (i.e., when viewed from the rear of aircraft 30, left ruddervator 32 is tilted clockwise and right ruddervator 34 is tilted counterclockwise). FIG. 3C is a rear view schematic illustration of the V-tail aircraft 30 of FIG. 3A with ruddervators 32, 34 rotated in a second direction. In particular, both ruddervators 32, 34 are tilted downwards (i.e., when viewed from the rear of aircraft 30, left ruddervator 32 is tilted counterclockwise and right ruddervator 34 is tilted clockwise).

The "angle of attack (AOA)" of an aircraft refers to the acute angle between the chord of the airfoil (i.e., aircraft wing) and the direction of undisturbed relative airflow, which is essentially the angle between the direction of the aircraft wing and the direction it is travelling. The "angle of sideslip (AOS)" refers to the angle between the aircraft centerline and the relative wind, which can be considered the directional AOA of the aircraft. An aircraft will experience stall if the aircraft exceeds a value known as the "critical angle of attack", resulting in a rapid decrease in lift caused by a separation of airflow from the wing surface. In a stall, the wing cannot generate adequate lift to sustain level flight. The lift coefficient generally increases as a function of AOA up until a maximum point, after which it decreases dramatically. This maximum lift coefficient point corresponds to the critical AOA. A stall may occur at any pitch attitude or any airspeed, but usually occurs when the airspeed is reduced below what is known as the "unaccelerated stall speed".

Each fixed-wing aircraft has a specific unique critical AOA at which a stall would occur. This value is usually static and predefined prior to the flight, such that the pilot and aircraft control systems can avoid reaching the critical AOA and thus avoid entering into a stall. The actual value of the critical AOA is dependent on various parameters associated with the design of the aircraft (e.g., wing profile, planform, wing aspect ratio), but is typically in the range of 8°-20°. These parameters may be influenced by the weather conditions. In particular, the temperature and humidity in the flight environment may result in the formation of ice and other forms of frozen precipitation on the surfaces of the wings, which in turn would affect the predefined critical AOA value, usually to further limit the critical AOA. Reference is now made to FIG. 4, which is a graph, generally referenced 50, showing the effect of accumulated ice on the lift coefficient of a V-tail aircraft as a function of the angle of attack. The y-axis of graph 50 represents the lift coefficient ($C_L$), while the x-axis of graph 50 represents the angle of attack ($\alpha$) in degrees. Graph 50 depicts the lift coefficient as a function of the angle of attack for V-tails with varying degrees of accumulated ice on their surfaces. Curve 52 represents a "clean V-tail", i.e., one with no accumulated ice, while curves 54, 56 and 58, respectively represent V-tails with accumulated ice at a thickness of increasing 5% chord-wise intervals.

Some aircrafts are equipped with mechanisms for ice removal from the wings, but these mechanisms are not always completely reliable or totally effective, and may still leave a certain amount of ice. Furthermore, the weather conditions tend to change in real-time during the actual flight, and cannot be forecasted ahead of time with 100% reliability. It is possible to completely refrain from implementing flights during weather conditions that would result in ice accumulation on the wing surfaces, or to modify the flight route to mitigate the effect of these weather conditions, although these approaches are not always feasible or practical. Safety considerations should be taken into account in defining the particular critical AOA that will be utilized during the flight. In severe weather conditions such as rain, snow and ice, the aircraft must reduce loss of aerodynamic characteristics to a tolerable level and increase its aerodynamic safety margin. Unmanned aerial vehicle (UAV) aircrafts are particularly sensitive to icy weather conditions, as such aircrafts are typically not equipped with mechanisms and resources for dealing with such a scenario.

U.S. Pat. No. 5,826,834 to Potter et al, entitled "Self adaptive limiter for automatic control of approach and landing", is directed to a fail passive flight control system for controlling the approach and landing of an aircraft. The control system includes a pitch limiter in communication with an autopilot. The limiter computes an estimated flight path angle based on vertical speed data and horizontal speed data of the aircraft. The limiter continuously computes a nominal flight path angle from the estimated flight path angle during a tracking phase of the approach/landing, until a predetermined altitude is reached and the nominal flight path angle is latched. The limiter continuously computes a nominal vertical speed based on the nominal flight path angle and horizontal speed data, and further continuously computes a vertical speed limit from the nominal vertical speed and altitude data. The limiter computes a pitch limit value from the vertical speed limit, the vertical speed, and aircraft pitch data. The autopilot limits the aircraft pitch to the pitch limit value, thus preventing the aircraft from pitching down excessively and descending below certification terrain clearance requirements.

U.S. Pat. No. 6,253,126 to Palmer, entitled "Method and apparatus for flight parameter monitoring and control", is directed to the monitoring of aircraft flight parameters, particularly air pressures acting on various surfaces of the aircraft. According to one aspect, the skin of the aircraft is provided with small openings or ports that are connected by an air pressure conduit to pressure sensors. The ports are sensitive to air pressure changes associated with flight at different speeds. The ports are also provided with means to deter extraneous matter (e.g., water, vapor, lubrication and deicing fluids, particulates), means to prevent icing of the port, and means to decontaminate the port (e.g., a port heater and a sump volume). The air pressures are measured, recorded and stored during a first flight condition, and subsequently during a second flight condition. The measurements are compared, and utilized for deducing aerodynamic performance data (e.g., correct angle of attack and margin to stall) and determining how to control the aircraft accordingly.

U.S. Patent Application Publication No. 2009/0062973 to Caldeira et al, entitled "Stall, buffeting, low speed and high attitude projection system", is directed to an aircraft flight control system for providing further safety controls. The aircraft control surfaces may be actuated to deploy to a certain position by a pilot interceptor (pilot input device) command. The control system monitors a set of flight parameters (e.g., angle-of-attack, angle-of-attack rate, airspeed, airspeed rate, flap position, gear position, pitch attitude, pitch rate, height above ground, ice detection) and processes the data to determine if the aircraft is operating inside a permitted envelope. If the aircraft is close to the envelope limits, the control system may bypass the pilot interceptor command to automatically position the control surfaces. The control system may protect the aircraft from scenarios such as low speeds, high attitude, stalls and buffetings.

Abzug, "V-Tail Stalling at Combined Angles of Attack and Sideslip Information", J. Aircraft, Vol. 36, No. 4: Engineering Notes, 1999, pp. 729-731, discloses the calculation of the V-tail panel geometric angle of attack (AOA) and sideslip angle (AOS) as a function of six variables: aircraft AOA ($\alpha$), aircraft AOS ($\beta$), V-tail average downwash angle ($\epsilon$), V-tail average sidewash angle ($\sigma$), V-tail dihedral angle ($\Gamma$), and V-tail incidence angle ($\delta$) for an all-moving V-tail. The calculations are valid for large AOA and AOS values to support studies of possible panel stalling. In a sample calculation of a landing approach for a 30° dihedral V-tail, the left panel would reach a stall point at an AOA of −12°, which is obtained at a right sideslip angle of 17°. The critical AOS for panel stall was found to be reduced by 3 degrees when the assumed sidewash angle is increased from 20% to 50% of the AOS. The critical AOS for panel stall was found to be reduced by 5 degrees when the downwash factor ($\epsilon_0$) is increased from 4 to 8. Induction from the opposite panel was found to reduce the local panel AOA of a V-tail in sideslip below those for the same AOA (i.e., raising the panel AOA at which a stall would occur), relative to the same V-tail without sideslip. Conversely, panel crossflow on a V-tail in sideslip lowers the panel AOA at which a stall would occur, relative to the same V-tail without sideslip.

SUMMARY OF THE DISCLOSED TECHNIQUE

In accordance with one aspect of the disclosed technique, there is thus provided an aircraft that includes monoblock flight control surfaces (FCS) and a controller for dynamically limiting the inclinations of the flight control surfaces during a stall susceptibility condition. The controller obtains the real-time calibrated airspeed of the aircraft, obtains the real-time angle of attack (AOA) of the aircraft, obtains the real-time sideslip angle (AOS) of the aircraft, and calculates the real-time local AOA and AOS of the flight control surfaces, based on the obtained aircraft parameters. The controller dynamically limits the inclination of each of the flight control surfaces relative to the critical values according to the calculated real-time local AOA and AOS of each of the flight control surfaces. The aircraft may be an unmanned aerial vehicle (UAV). The aircraft may be a V-tail aircraft. The flight control surfaces may include at least a left tail stabilizer and a right tail stabilizer, which are independently dynamically limited. The aircraft may further include temperature and precipitation sensors for detecting current weather conditions in the aircraft environment. The stall susceptibility condition may include icy conditions.

In accordance with another aspect of the disclosed technique, there is thus provided a method for dynamically limiting the inclinations of the monoblock flight control surfaces (FCS) of an aircraft. The method includes the procedure of activating dynamic limitation of the flight control surfaces if a stall susceptibility condition is detected in the current environment of the aircraft. The method further includes the procedures of obtaining the real-time calibrated airspeed of the aircraft, obtaining the real-time angle of attack (AOA) of the aircraft, obtaining the real-time sideslip angle (AOS) of the aircraft, and calculating the real-time local AOA and AOS of the flight control surfaces, based on the obtained aircraft parameters. The method further includes the procedure of dynamically limiting the inclination of each of the flight control surfaces relative to the critical values according to the calculated real-time local AOA and AOS of each of the flight control surfaces. The real-time calibrated airspeed of the aircraft may be measured using an aircraft measurement apparatus. Alternatively, the real-time calibrated airspeed of the aircraft may be estimated if the measured airspeed data is deemed unsuitable. The estimation may be based on the density, engine RPM, measured throttle, measured pitch angle, and measured x-axis acceleration of the aircraft, using an open loop state-space model. The real-time AOA of the aircraft may be estimated based on the measured z-axis acceleration and calibrated airspeed of the aircraft. The real-time AOS of the aircraft may be estimated based on the measured y-axis acceleration, true airspeed, calibrated airspeed, yaw rate, and rudder angle of the aircraft. The real-time local AOA and AOS of the flight control surfaces may be calculated by estimating the local AOA and AOS based on previously calculated average FCS downwash angle and FCS sidewash angle, known FCS dihedral angle, and airspeed velocity components in the wind coordinate system axes. The method may further include the procedure of detecting current weather conditions in the aircraft environment using temperature and precipitation sensors. The aircraft may be an unmanned aerial vehicle (UAV). The aircraft may be a V-tail aircraft. The stall susceptibility condition may include icy conditions.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1C:
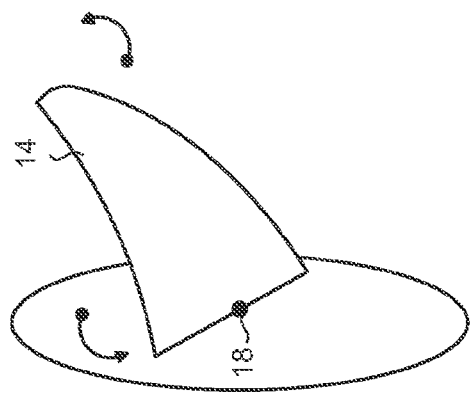
FIG. 1C is a rear view schematic illustration of the ruddervator of FIG. 1A rotated in a counterclockwise direction.
Figure 1B:
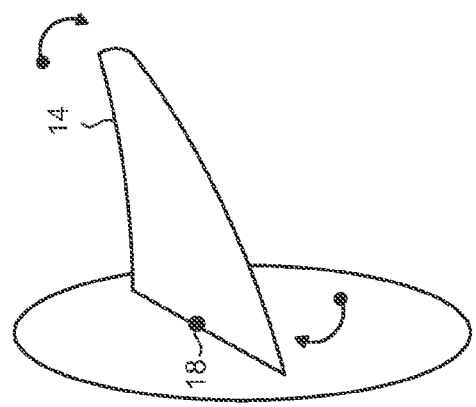
FIG. 1B is a rear view schematic illustration of the ruddervator of FIG. 1A rotated in a clockwise direction.
Figure 1A:
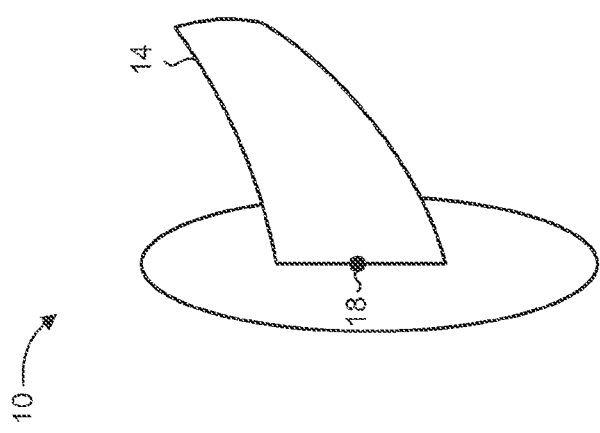
FIG. 1A is a rear view schematic illustration of a V-tail aircraft ruddervator in a centered position about a first rotational axis.
Figure 2C:
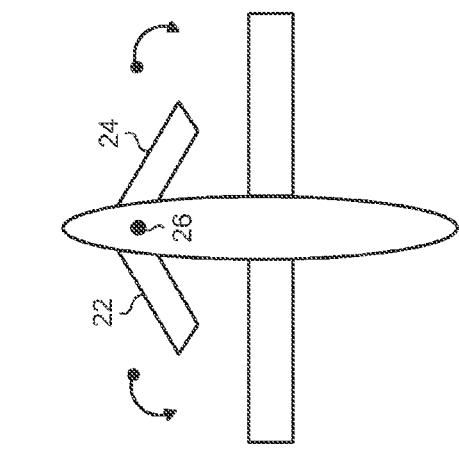
FIG. 2C is a top view schematic illustration of the V-tail aircraft of FIG. 2A with ruddervators rotated in a second direction.
Figure 2A:
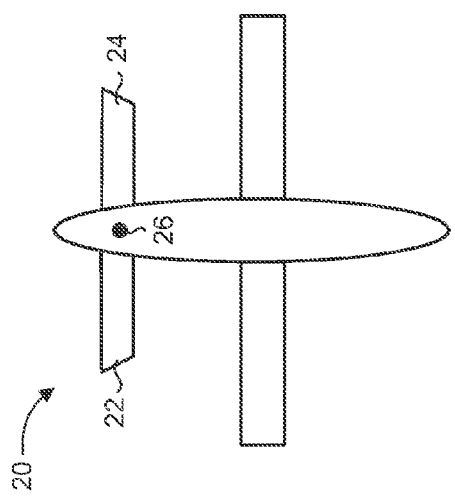
FIG. 2A is a top view schematic illustration of a V-tail aircraft with ruddervators in a centered position about a second rotational axis.
Figure 2B:
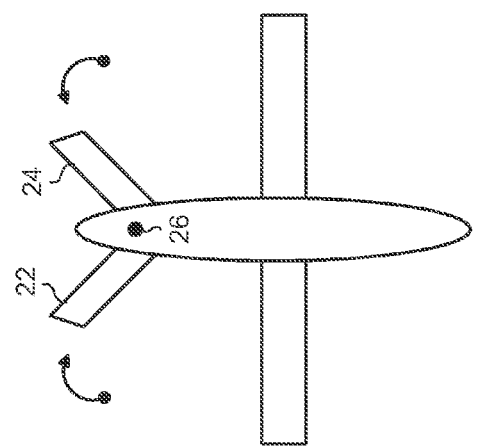
FIG. 2B is a top view schematic illustration of the V-tail aircraft of FIG. 2A with ruddervators rotated in a first direction.
Figure 3A:
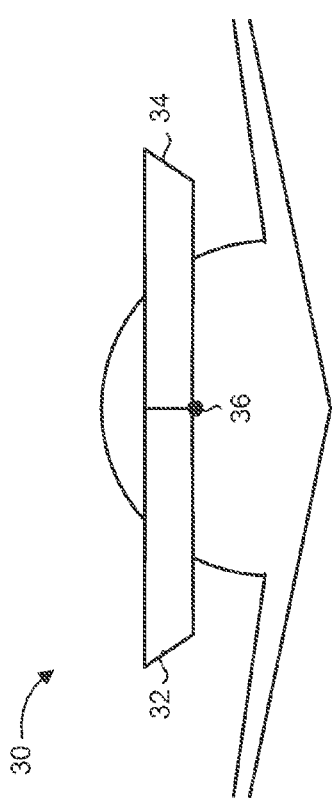
FIG. 3A is a rear view schematic illustration of a V-tail aircraft with ruddervators in a centered position about a third rotational axis.
Figure 3C:
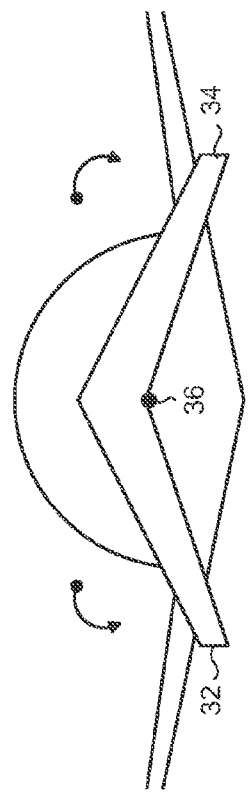
FIG. 3C is a rear view schematic illustration of the V-tail aircraft of FIG. 3A with ruddervators rotated in a second direction.
Figure 3B:
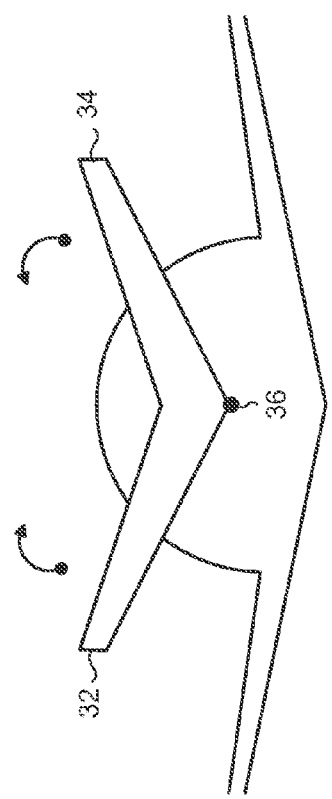
FIG. 3B is a rear view schematic illustration of the V-tail aircraft of FIG. 3A with ruddervators rotated in a first direction.
Figure 4:
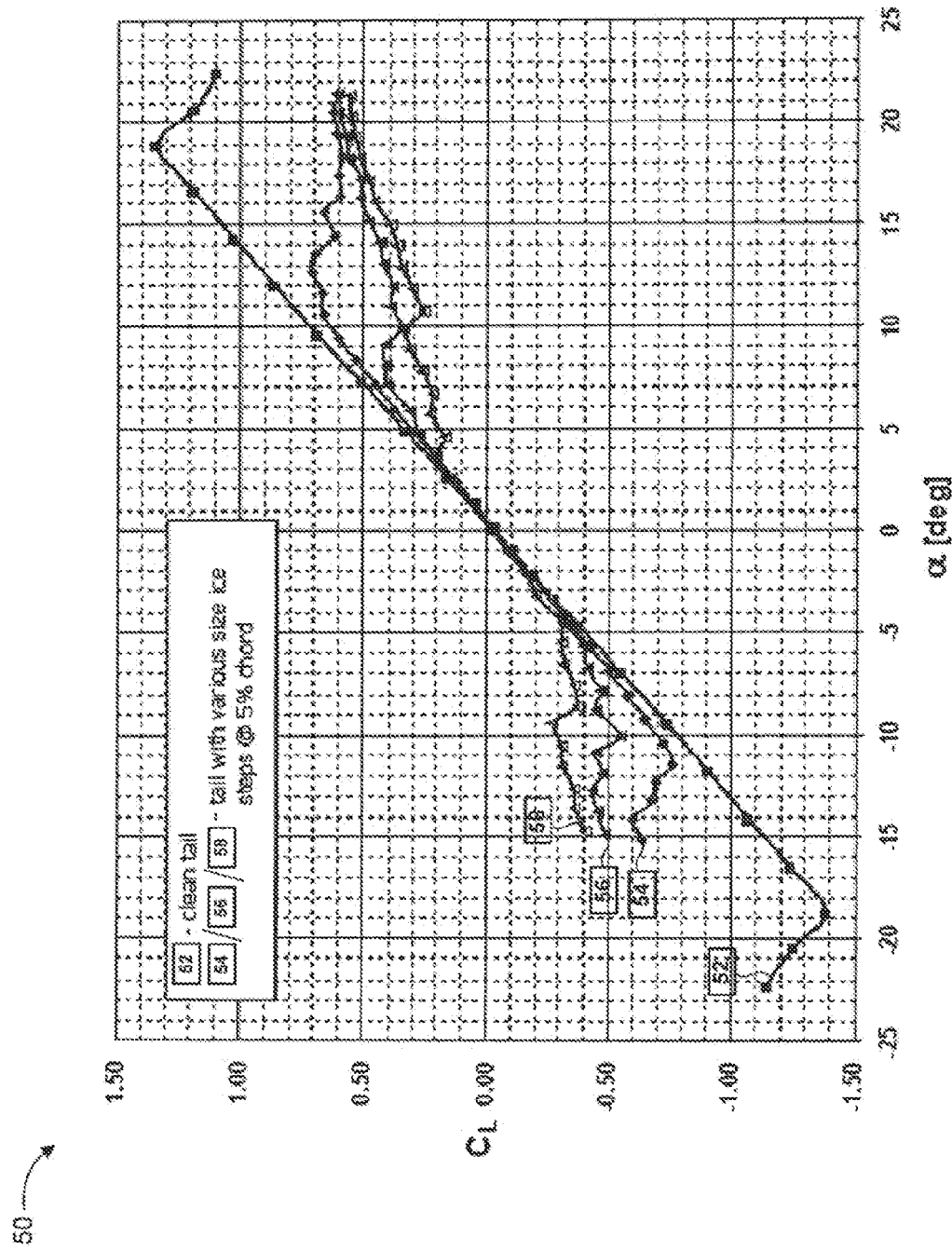
FIG. 4 is a graph showing the effect of accumulated ice on the lift coefficient of a V-tail aircraft as a function of the angle of attack.

The disclosed technique overcomes the disadvantages of the prior art by providing a method for dynamically limiting the inclinations of the monoblock flight control surfaces of an aircraft during flight in a stall susceptibility scenario, such as icy weather conditions. The disclosed technique improves upon the usage of a static limitation on the control surfaces inclination for preventing stalling, by providing a real-time dynamic limitation for the degree of inclination of each of the control surfaces according to aerodynamic constraints. The real-time tracking and subsequent dynamic limitation applied to each individual flight control surface ultimately provides the aircraft with enhanced maneuvering ability. The method includes detecting current weather conditions and activating a dynamic limitation of the aircraft flight control surfaces if a stall susceptibility condition is detected. The real-time calibrated airspeed of the aircraft is measured or estimated. The real-time angle of attack (AOA) of the aircraft is measured or estimated. The real-time sideslip angle (AOS) of the aircraft is measured or estimated. The real-time local AOA and AOS of the control surfaces are calculated from aircraft parameters. The inclination of the control surfaces are dynamically limited based on the calculated local AOA and AOS, where the limitation is applied independently to each control surface (e.g., a left tail stabilizer and a right tail stabilizer) in accordance with the parameters associated with that specific control surface. The disclosed technique is particularly applicable to unmanned aerial vehicle (UAV), specifically aircrafts implementing automatic flight control, but is generally applicable to other types of aircrafts as well. Additionally, the disclosed technique is particularly applicable to aircrafts with a V-tail configuration, but is generally applicable to other types of aircrafts (e.g., T-tail aircrafts) as well.

The term "monoblock" control surfaces, and any variations thereof, as used herein refers to flight control surfaces that are integrally formed together with the respective wing or tail stabilizer surface, i.e., rather than being formed as a separate movable trailing edge. Namely, the wing or tail in its entirety is also formed and operates as a unitary flight control surface. For example, in a V-tail aircraft with monoblock control surfaces, the left tail stabilizer and left ruddervator is integrated into a single movable surface (rotatable about a first control axis), while the right tail stabilizer and right ruddervator is similarly integrated into a single movable surface (rotatable about a second control axis), for controlling the aircraft pitch and yaw motions.

The terms "tilting" and "inclining", and any variations thereof, are used herein interchangeably to refer to the operation of adjusting the alignment of the entire control surface plane in relation to a given reference plane or axis, or alternatively, rotating the entire control surface plane about a given reference plane/axis, i.e., such that the plane of the control surface defines a particular inclination angle with respect to the reference plane/axis. Such an operation does not result in any manipulation of the form or shape of the control surface itself (e.g., a twisting or deformation thereof).

The term "icy conditions", and any variations thereof, as used herein refers to weather conditions that result in the accumulation of frozen precipitation on the aircraft wings and other aircraft surfaces, which influences the real-time critical angle of attack (AOA) of the aircraft (beyond which the aircraft would enter into a stall).

The term "stall susceptibility condition", and any variations thereof, as used herein refers to any situation that causes the aircraft critical AOA to change and/or any situation that increases the likelihood of the aircraft entering into a stall. One type of stall susceptibility condition is icy conditions (as defined above).

The following abbreviations will be used hereinbelow:
UAV=Unmanned Aerial Vehicle
A/V=Aerial Vehicle
$a_Y$=A/V Y-axis acceleration (body coordinates)
$a_Z$=A/V Z-axis acceleration (body coordinates)
b=A/V Span
L=Lift
m=Mass
p=A/V roll rate
r=A/V yaw rate
S=A/V reference area
$C_L$=Lift coefficient
$C_{L0}$=Lift coefficient at zero angle of attack
$C_{L\alpha}$=Lift coefficient slope
$C_Y$=Y-axis total force coefficient (body coordinates)
$C_{Y0}$=Y-axis force coefficient at trim
$C_{Y\beta}$=Y-axis force coefficient due to sideslip angle
$C_{Y\delta a}$=Y-axis force coefficient due to aileron angle
$C_{Y\delta r}$=Y-axis force coefficient due to rudder angle
$C_{Yp}$=Y-axis force coefficient due to roll rate
$C_{Yr}$=Y-axis force coefficient due to yaw rate
$V_{CAS}$=Calibrated airspeed
$V_{TAS}$=True airspeed $\alpha$=AOA=Angle of attack
$\beta$=AOS=Sideslip angle
$\rho_0$=Air density at sea level
$\epsilon$=V-tail average downwash angle
$\sigma$=A/V track angle (angle between north and ground velocity)
$\sigma_a$=V-tail average sidewash angle
$\delta$=V-tail control angle
$\delta a$=aileron angle
$\delta r$=rudder angle
$\Gamma$=V-tail dihedral angle Reference is now made to FIG. 5, which is a block diagram of an aircraft, generally referenced 100, constructed and operative in accordance with an embodiment of the disclosed technique. Aircraft 100 includes a controller 102, temperature and precipitation sensors 104, flight parameters measurement apparatuses (FPMA) 106, flight control surfaces (FCS) actuators 108, and flight control surfaces 110. FCS 110 includes a left tail stabilizer 112 and a right tail stabilizer 114. FPMA 106 includes at least one pitot tube 116. Controller 102 is coupled with temperature and precipitation sensors 104, with FPMA 106, and with FCS actuators 108. FCS actuators 108 are further coupled with left tail stabilizer 112 and with right tail stabilizer 114.

Aircraft 100 is preferably a UAV, for example a Hermes® series type UAV (such as Hermes® 450 or Hermes® 900), which is a UAV that is classified as a class 1 (small, light) according to Rockwell RPV Flying Qualities Design Criteria. The longitudinal and lateral stabilization and control of a Hermes® 450 UAV is performed using two monoblock V-tail control surfaces. Accordingly, aircraft 100 is preferably a V-tail aircraft, with monoblock flight control surfaces.

Figure 5:
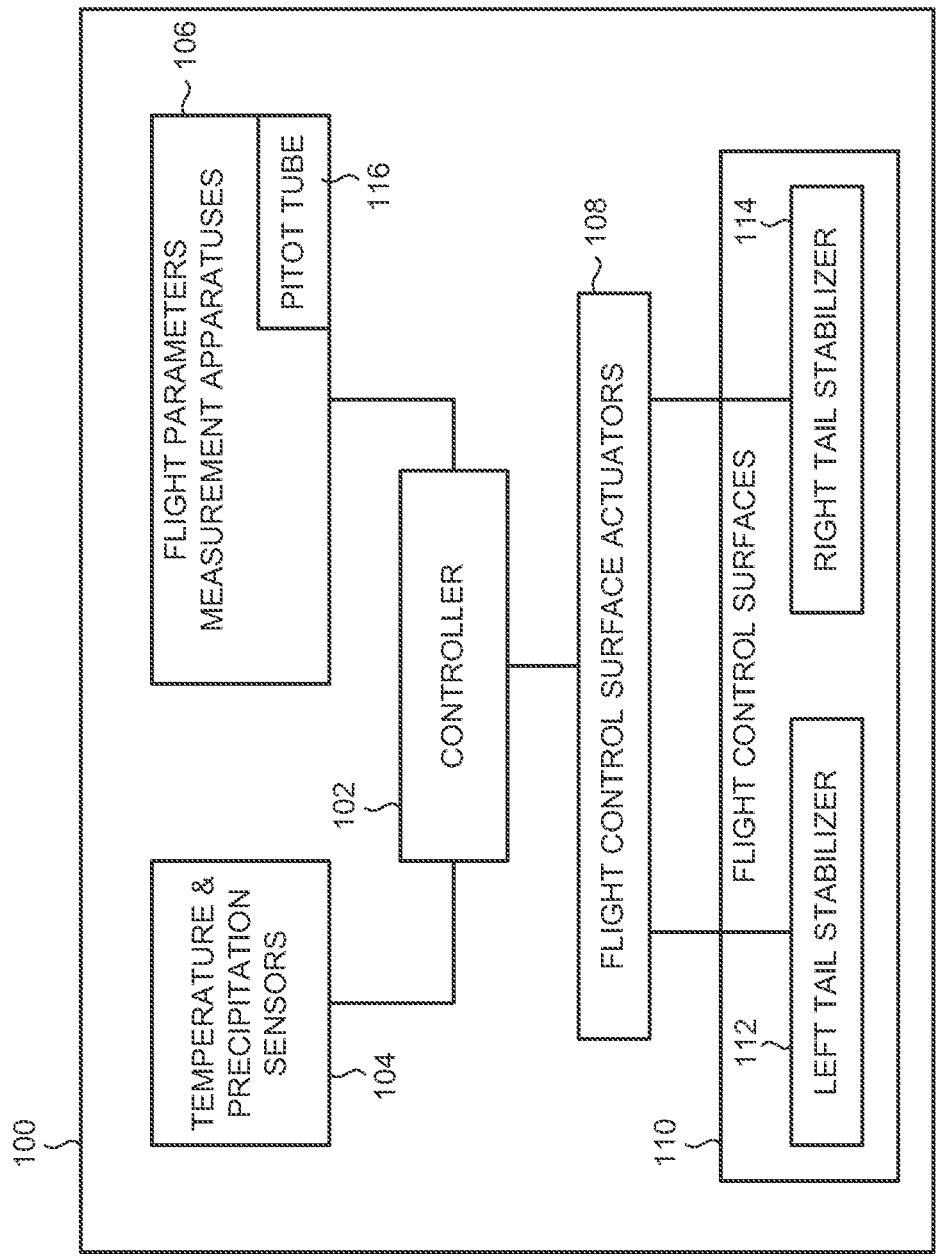
FIG. 5 is a block diagram of an unmanned aerial vehicle (UAV) with a V-tail configuration, constructed and operative in accordance with an embodiment of the disclosed technique.
Figure 6:
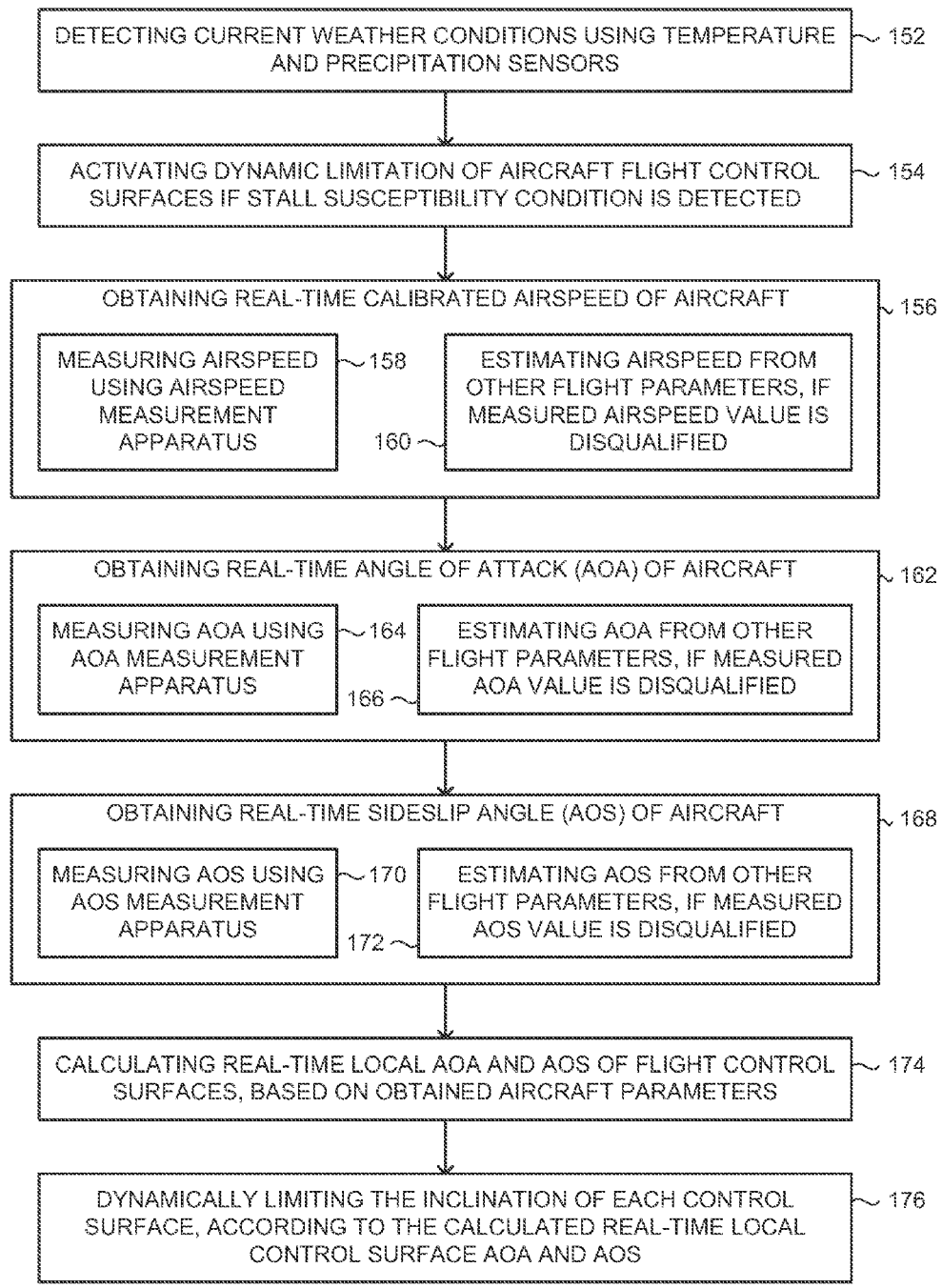
FIG. 6 is a block diagram of a method for dynamically limiting the inclinations of monoblock flight control surfaces of an aircraft, operative in accordance with an embodiment of the disclosed technique.

Reference is now made to FIG. 6, which is a block diagram of a method for dynamically limiting the inclinations of monoblock flight control surfaces of an aircraft, operative in accordance with an embodiment of the disclosed technique. In procedure 152, current weather conditions are detected using temperature and precipitation sensors. Referring to FIG. 5, temperature and precipitation sensors 104 detect various weather parameters (e.g., temperature, precipitation level), to provide an indication of the current weather conditions in the environment in which aircraft 100 is currently situated. Controller 102 may optionally determine an updated real-time critical AOA for aircraft 100 that is appropriate for the detected real-time weather conditions.

In procedure 154, dynamic limitation of the aircraft flight control surfaces is activated if a stall susceptibility condition is detected. Referring to FIG. 5, if the current weather parameters detected by temperature and precipitation sensors 104 provide an indication of icy conditions in the environment (e.g., if the detected parameters exceed some predefined threshold levels or meet some predefined criteria), than aircraft 100 activates the implementation of dynamic limitation of flight control surfaces 110 in accordance with the real-time conditions. It is appreciated that the dynamic limitation may generally be activated upon detection of other types of stall susceptibility conditions as well.

In procedure 156, the real-time calibrated airspeed of the aircraft is obtained. Procedure 156 may be implemented via procedure 158, in which the real-time calibrated airspeed of the aircraft is measured using an airspeed measurement apparatus, or alternatively via procedure 160, in which the real-time calibrated airspeed of the aircraft is estimated from other flight parameters if the measured airspeed value is disqualified. Referring to FIG. 5, pitot tube 116 acquires measurements of the real-time calibrated airspeed of aircraft 100. A pitot tube is a pressure measurement instrument that measures fluid flow velocity, and is commonly used to determine the airspeed of an aircraft. Controller 102 receives the acquired calibrated airspeed measurements. If the measurements acquired by pitot tube 116 is deemed unsuitable or insufficiently reliable, then these measurements are disqualified and an updated real-time calibrated airspeed value is estimated. In certain situations, particularly during icy conditions, a pitot tube does not provide reliable measurements. For example, if aircraft 100 includes multiple pitot tubes 116 and there are significant discrepancies between the airspeed measurements provided by each of the pitot tubes 116, then these measurements are deemed unsuitable and an estimation process is carried out instead. Controller 102 estimates the calibrated airspeed using an open loop state-space observer with a heuristic correction component (based on flight test data). The open loop state-space model utilizes the following flight parameters as input: density, engine RPM, measured throttle, measured pitch angle, and measured X-axis acceleration. These flight parameters are measured by FPMA 106 and transferred to controller 102. The density is calculated using a fully redundant static pressure sensor (e.g., included in FPMA 106), which was tested and shown to perform with high reliability under icy conditions.

In procedure 162, the real-time angle of attack (AOA) of the aircraft is obtained. Procedure 162 may be implemented via procedure 164, in which the aircraft AOA is measured using an AOA measurement apparatus, or alternatively via procedure 166, in which the aircraft AOA is estimated from other flight parameters if the measured AOA value is disqualified. Referring to FIG. 5, an AOA sensor or other suitable sensor of FPMA 106 acquires measurements of the real-time AOA of aircraft 100. Pitot tube 116 may be utilized to obtain the AOA measurements. If the measurements acquired by FPMA 106 is deemed unsuitable or insufficiently reliable (which is likely to occur during icy conditions), then these measurements are disqualified and an updated real-time AOA value is estimated. In particular, controller 102 directly calculates the AOA of aircraft 100 using the following equations:

$$1) \begin{cases} L = 0.5 \cdot \rho_0 \cdot V_{CAS}^2 \cdot S \cdot C_L = m \cdot a_Z \\ 2) \quad \forall \alpha \leq \alpha_{stall}) C_L = C_{L0} + C_{L\alpha} \cdot \alpha \end{cases}$$

$$\Rightarrow \alpha = \frac{1}{C_{L\alpha}} \cdot \frac{-m \cdot a_Z}{0.5 \cdot \rho_0 \cdot V_{CAS}^2 \cdot S} - \frac{C_{L0}}{C_{L\alpha}}$$

Equations (1) and (2) were derived from the aerodynamic database of a Hermes® 450 UAV extracted from wind tunnel tests and validated using flight tests. If for example aircraft 100 is a Hermes® 450 type UAV, the AOA can be estimated using the following equation:

$$\alpha = -1.9041 \cdot \frac{m \cdot a_Z}{V_{CAS}^2} - 6.616$$

Assuming a precise aerodynamic database, the only source of error in this estimation arises from delays and errors in the Z-axis acceleration and the calibrated airspeed measurements/estimates.

In procedure 168, the real-time sideslip angle (AOS) of the aircraft is obtained. Procedure 168 may be implemented via procedure 170, in which the aircraft AOS is measured using an AOS measurement apparatus, or alternatively via procedure 172, in which the aircraft AOS is estimated from other flight parameters if the measured AOS value is disqualified.

Referring to FIG. 5, an AOS sensor or other suitable sensor of FPMA 106 acquires measurements of the real-time AOS of aircraft 100. Pitot tube 116 may be utilized to obtain the AOS measurements. If the measurements acquired by FPMA 106 is deemed unsuitable or insufficiently reliable (which is likely to occur during icy conditions), then these measurements are disqualified and an updated real-time AOS value is estimated. In particular, controller 102 calculates the AOS of aircraft 100 indirectly, based on a calculated approximation of the AOS derivative and a simplified approximation of the AOS itself. Direct calculation of the AOS of the aircraft is problematic since certain stability derivatives ($C_{Y\beta}, C_{Y\delta r}$) are functions of the AOS, as is evident from the following force equation along the aircraft y-axis:

$$3) \; C_Y = C_{Y0} + C_{Y\beta} \cdot \beta + C_{Y\delta a} \cdot \delta a + C_{Y\delta r} \cdot \delta r + \ldots + \frac{b}{2 \cdot V_{CAS}} \cdot (C_{Yp} \cdot p + C_{Yr} \cdot r)$$

Figure 7:
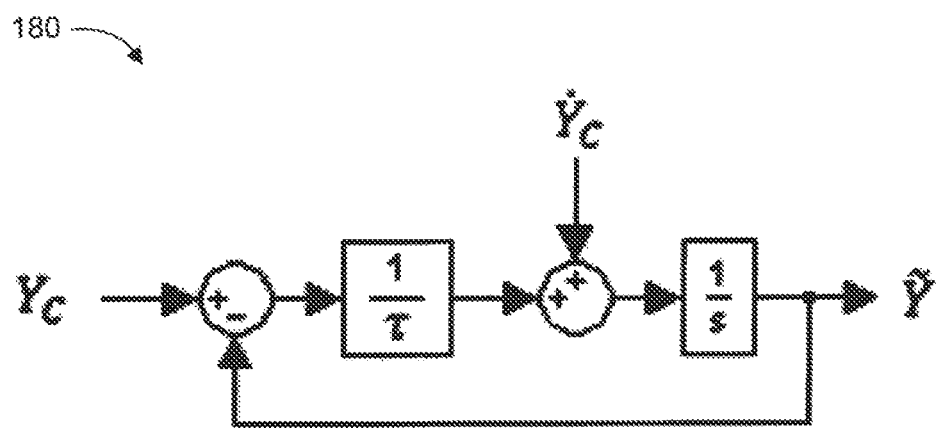
FIG. 7 is a schematic illustration of a complementary filter architecture used for calculating an estimation of the aircraft sideslip angle (AOS), operative in accordance with an embodiment of the disclosed technique.

Reference is now made to FIG. 7, which is a schematic illustration of a complementary filter architecture, generally referenced 180, used for calculating an estimation of the aircraft sideslip angle (AOS), operative in accordance with an embodiment of the disclosed technique. The output of complementary filter architecture 180 is the summation of a low frequency response component and a high frequency response component. The low frequency response component is a simplified approximation of the AOS, which may be very accurate initially but which deviates over time. The high frequency response component corresponds to the integration over an accurate approximation of the AOS derivative, which would be accurate only as time progresses. A correct summation of these two components (i.e., by a correct selection of t) provides an adequate estimation of the AOS value.

A simplified but precise approximation of the AOS derivative is calculated using the following equation (assuming $$\alpha << \frac{\pi}{2}):$$

$$4) \; \dot{\beta} \equiv \sigma - (p \cdot \sin(\alpha) + r \cdot \cos(\alpha)) \cong \frac{a_Y}{V_{TAS}} - r$$

To obtain the simplified approximation of the AOS, equation (3) above is simplified into the following crude approximation (assuming $$C_{Yp}, C_{Y\delta a} << 1):$$

$$5) \; C_Y = \frac{m \cdot a_Y}{0.5 \cdot \rho_0 \cdot V_{CAS}^2 \cdot S} \cong \frac{b \cdot C_{Yr} \cdot r}{2 \cdot V_{CAS}} + C_{Y\beta} \cdot \beta + C_{Y\delta r} \cdot \delta r$$

$$\rightarrow \beta \cong \frac{1}{C_{Y\beta}} \left[ \frac{m \cdot a_Y}{0.5 \cdot \rho_0 \cdot V_{CAS}^2 \cdot S} - \frac{b \cdot C_{Y\gamma} \cdot r}{2 \cdot V_{CAS}} - C_{Y\delta r} \cdot \delta r \right];$$

where $C_{Y\beta}$, $C_{Y\delta r}$ and $C_{Yr}$ are calculated by recording several UAV flights in various configurations (e.g., weight and center of gravity) with a pitot tube that measures AOS, and then using optimization techniques to derive a set of discrete values for $C_{Y\beta}$, $C_{Y\delta r}$ and $C_{Yr}$ which minimizes the overall difference between the measured AOS and the estimated AOS. A filtered FCS issued rudder command may be used to eliminate the estimation consolidation upon the measured rudder angle ($\delta r$).

Figure 8:
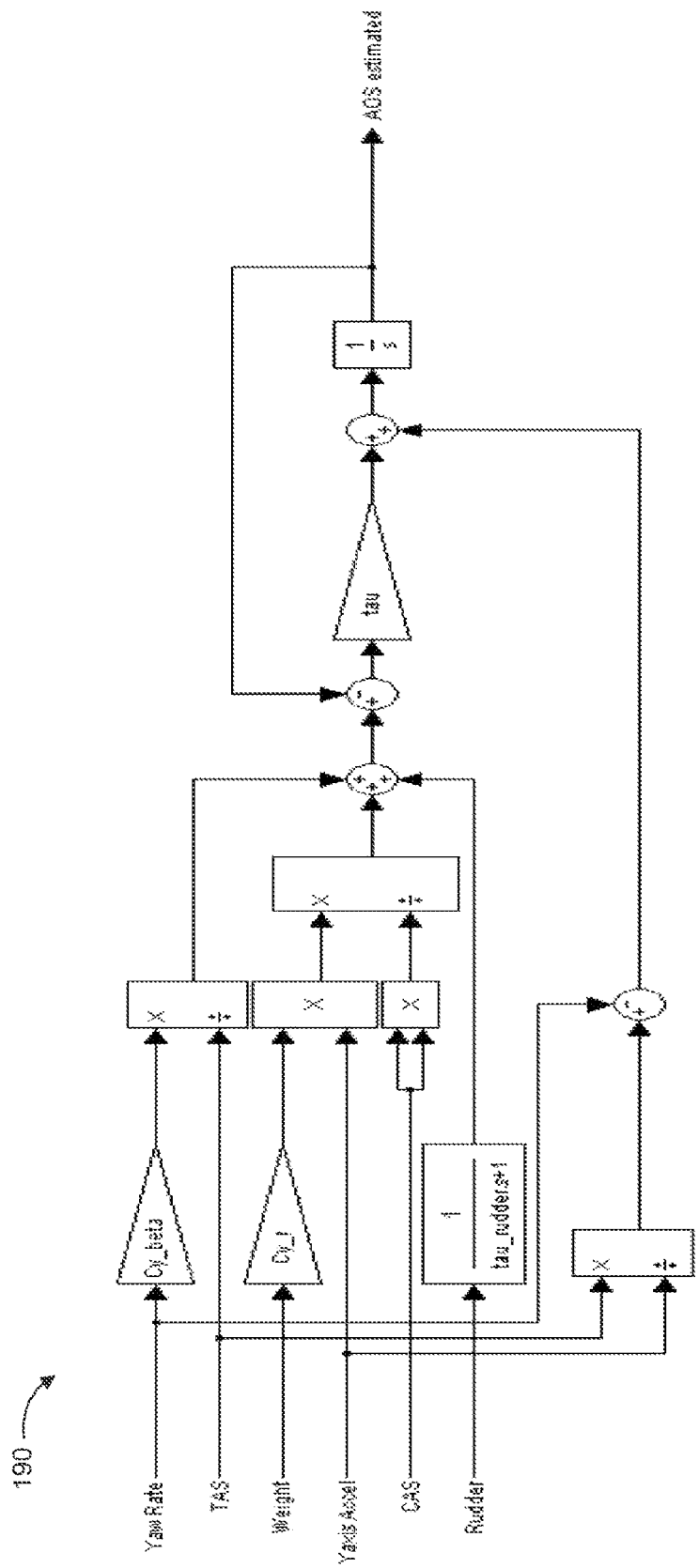
FIG. 8 is a schematic illustration of a process architecture for estimating the aircraft sideslip angle (AOS), operative in accordance with an embodiment of the disclosed technique.

Equations (4) and (5) above are then applied within complementary filter architecture 180 to provide an accurate AOS estimation, as the low-pass filtered AOS approximation yields appropriate AOS values with a steady state error that is nullified by the high-pass filtered integration of the AOS derivative. Reference is now made to FIG. 8, which is a schematic illustration of a process architecture, generally referenced 190, for estimating the aircraft sideslip angle (AOS), operative in accordance with an embodiment of the disclosed technique.

Referring back to FIG. 6, in procedure 174, the real-time local angle of attack (AOA) and sideslip angle (AOS) of the flight control surfaces are calculated, based on the obtained aircraft parameters. Referring to FIG. 5, controller 102 calculates the local AOA and the local AOS of left tail stabilizer 112 and right tail stabilizer 114. An FCS coordinate system is defined as follows: the x-axis is positive toward the forward direction in the FCS chord plane, the z-axis is positive normal to the FCS chord plane, and the y-axis is positive toward the right. Subsequently, the following four successive rotations may be implemented to transform from the wind coordinate system (at which the aircraft AOA and AOS have been obtained) to the FCS coordinate system, neglecting the effects of the A/V aerial velocity:

1) Rotation by $\beta + \sigma_a$;
2) Rotation by $\alpha - \epsilon$;
3) Rotation by $\Gamma$;
4) Rotation by $\delta$;

where:
$\epsilon$=the average downwash angle at the respective tail stabilizer;
$\sigma_a$=the average sidewash angle at the respective tail stabilizer;
$\Gamma$=the dihedral of the FCS plane (positive for left panel); and
$\delta$=the FCS control angle (for a monoblock tail stabilizer).

In matrix form, these transformations can be represented as follow:

$$\begin{Bmatrix} V_X \\ V_Y \\ V_Z \end{Bmatrix}_{V\text{-}tail} = \begin{Bmatrix} \cos(\delta) & 0 & -\sin(\delta) \\ 0 & 1 & 0 \\ \sin(\delta) & 0 & \cos(\delta) \end{Bmatrix} \cdot$$

$$\begin{Bmatrix} 1 & 0 & 0 \\ 0 & \cos(\Gamma) & \sin(\Gamma) \\ 0 & -\sin(\Gamma) & \cos(\Gamma) \end{Bmatrix} \cdot \begin{Bmatrix} \cos(\alpha - \epsilon) & 0 & -\sin(\alpha - \epsilon) \\ 0 & 1 & 0 \\ \sin(\alpha - \epsilon) & 0 & \cos(\alpha - \epsilon) \end{Bmatrix} \cdot$$

$$\begin{Bmatrix} \cos(\beta + \sigma_a) & -\sin(\beta + \sigma_a) & 0 \\ \sin(\beta + \sigma_a) & \cos(\beta + \sigma_a) & 0 \\ 0 & 0 & 1 \end{Bmatrix} \cdot \begin{Bmatrix} V_X \\ V_Y \\ V_Z \end{Bmatrix}_{WIND}$$

The FCS local AOA and AOS can now be derived using the following relations:

$$\alpha_{V\text{-}tail} =$$
$$\delta + tg^{-1}\left( \frac{\cos(\Gamma) \cdot \sin(\alpha - \epsilon) \cdot \cos(\beta + \sigma_a)}{\cos(\alpha - \epsilon) \cdot \cos(\beta + \sigma_a)} + \ldots - \frac{\sin(\Gamma) \cdot \sin(\beta + \sigma_a)}{\cos(\alpha - \epsilon) \cdot \cos(\beta + \sigma_a)} \right)$$

$$\beta_{V\text{-}tail} = \sin^{-1}(\cos(\Gamma) \cdot \sin(\beta + \sigma) + \ldots \sin(\Gamma) \cdot \sin(\alpha - \epsilon) \cdot \cos(\beta + \epsilon));$$

using previously calculated average FCS downwash angle and FCS sidewash angle values, using the known FCS dihedral angle, and using airspeed velocity components in the wind coordinate system axes. It is appreciated that the calculated local AOA and AOS values may be asymmetrical for each side of the FCS, e.g., the values for left tail stabilizer 112 may be different than those for right tail stabilizer 114.

In procedure 176, the inclination of each control surface is dynamically limited according to the calculated real-time local control surface AOA and AOS. Referring to FIG. 5, controller 102 sends signals to FCS actuators 108 to limit the degree of tilting left tail stabilizer 112 and right tail stabilizer 114, such that the calculated real-time local AOA and AOS values of these control surfaces are sufficiently far from the critical AOA and AOS values (i.e., in accordance with aerodynamic safety constraints). It is appreciated that these dynamic limitations are applied asymmetrically to each relevant FCS in accordance with the parameters associated with that specific control surface (e.g., the limitation applied to left tail stabilizer 112 may different than the limitation applied to right tail stabilizer 114).

Figure 9:
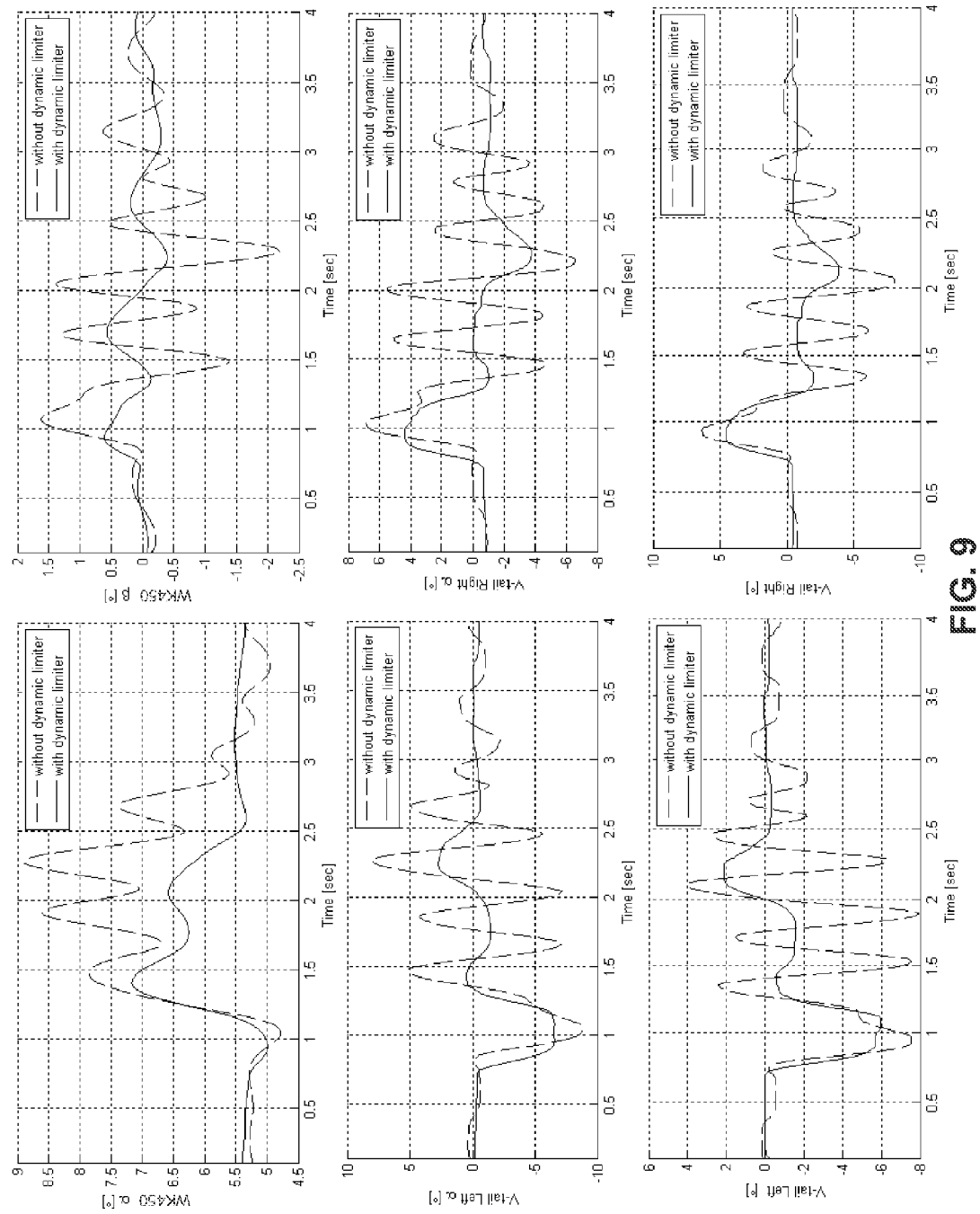
FIG. 9 is a plurality of graphs showing the result of a simulation of the dynamic V-tail angle limitation of the disclosed technique in conjunction with a Hermes® 450 UAV.

The disclosed technique was tested in a simulation environment (flight tests proven) with an aerodynamic database based upon several ice wind tunnel runs. Reference is now made to FIG. 9, which is a plurality of graphs showing the result of a simulation of the dynamic V-tail angle limitation of the disclosed technique in conjunction with a Hermes® 450 UAV. A simulation of a 1 second singlet in the pitch channel while the Hermes® 450 performs a coordinated turn with 10° roll angle is shown in FIG. 9 (height=8 Kft, calibrated airspeed=60 kn; in the presence of medium turbulence, according to the Dryden turbulence model). As can be seen in FIG. 9, the dynamic V-tail angle limitation of the disclosed technique limits the V-tail angle in such a way that the local AOA remains far from its stall limit (stall AOA=10.5°, maximum AOA without limiter=8.9° at the left V-tail, maximum AOA with limiter=6.5° at the right V-tail). Moreover the UAV dynamic responses (as can be seen from the Hermes® 450 AOA and AOS) are clearly more satisfactory with the dynamic V-tail angle limitation of the disclosed technique.

It will be appreciated by persons skilled in the art that the disclosed technique is not limited to what has been particularly shown and described hereinabove.

The invention claimed is:

1. An aircraft comprising monoblock flight control surfaces and a controller for dynamically limiting the inclinations of said flight control surfaces in said aircraft during a stall susceptibility condition, said controller operative to obtain the real-time calibrated airspeed of said aircraft, to obtain the real-time angle of attack (AOA) of said aircraft, to obtain the real-time sideslip angle (AOS) of said aircraft, to calculate the real-time local AOA and AOS of said flight control surfaces based on the obtained aircraft parameters, and to dynamically limit the inclination of each of said flight control surfaces relative to the critical values according to the calculated real-time local AOA and AOS of each of said flight control surfaces.

2. The aircraft of claim 1, wherein said aircraft is an unmanned aerial vehicle (UAV).

3. The aircraft of claim 1, wherein said aircraft is a V-tail aircraft.

4. The aircraft of claim 1, wherein said flight control surfaces comprises at least a left tail stabilizer and a right tail stabilizer, which are independently dynamically limited.

5. The aircraft of claim 1, further comprising temperature and precipitation sensors coupled with said controller, said temperature and precipitation sensors operative for detecting current weather conditions in said aircraft environment.

6. The aircraft of claim 1, wherein said stall susceptibility condition comprises icy conditions.

7. A method for dynamically limiting the inclinations of the monoblock flight control surfaces of an aircraft, the method comprising the procedures of:
- activating dynamic limitation of said flight control surfaces if a stall susceptibility condition is detected in the current environment of said aircraft;
- obtaining the real-time calibrated airspeed of said aircraft;
- obtaining the real-time angle of attack (AOA) of said aircraft;
- obtaining the real-time sideslip angle (AOS) of said aircraft;
- calculating the real-time local AOA and AOS of said flight control surfaces, based on the obtained aircraft parameters; and
- dynamically limiting the inclination of each of said flight control surfaces relative to the critical values according to the calculated real-time local AOA and AOS of each of said flight control surfaces.

8. The method of claim 7, wherein said procedure of obtaining the real-time calibrated airspeed of said aircraft comprises measuring the real-time calibrated airspeed of said aircraft using an aircraft measurement apparatus.

9. The method of claim 7, wherein said procedure of obtaining the real-time calibrated airspeed of said aircraft comprises estimating the real-time calibrated airspeed of said aircraft if measured airspeed data is deemed unsuitable.

10. The method of claim 9, wherein said estimating is based on the density, engine RPM, measured throttle, measured pitch angle, and measured x-axis acceleration of said aircraft, using an open loop state-space model.

11. The method of claim 7, wherein said procedure of obtaining the real-time AOA of said aircraft comprises estimating said AOA based on the measured z-axis acceleration and calibrated airspeed of said aircraft.

12. The method of claim 7, wherein said procedure of obtaining the real-time AOS of said aircraft comprises estimating said AOS based on the measured y-axis acceleration, true airspeed, calibrated airspeed, yaw rate, and rudder angle of said aircraft.

13. The method of claim 7, wherein said procedure of calculating the real-time local AOA and AOS of said flight control surfaces comprises estimating said local AOA and AOS based on previously calculated average FCS downwash angle and FCS sidewash angle, known FCS dihedral angle, and airspeed velocity components in the wind coordinate system axes.

14. The method of claim 7, further comprising the procedure of detecting current weather conditions in said aircraft environment using temperature and precipitation sensors.

15. The method of claim 7, wherein said aircraft is an unmanned aerial vehicle (UAV).

16. The method of claim 7, wherein said aircraft is a V-tail aircraft.

17. The method of claim 7, wherein said stall susceptibility condition comprises icy conditions.

* * * * *